Patented July 21, 1931

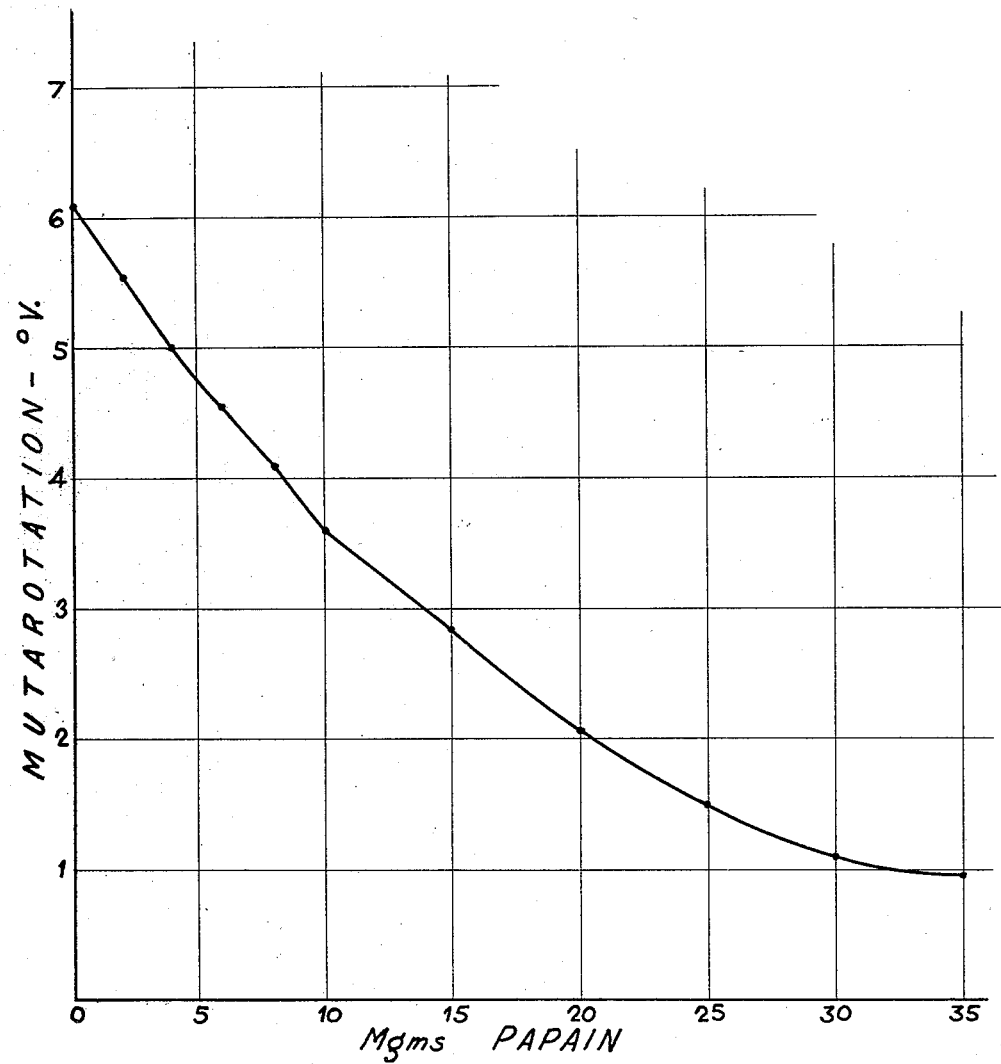

1,815,709

UNITED STATES PATENT OFFICE

HERBERT C. GORE, OF SCARSDALE, AND CHARLES N. FREY, OF NEW YORK, N. Y., ASSIGNORS, BY MESNE ASSIGNMENTS, TO STANDARD BRANDS INCORPORATED, OF DOVER, DELAWARE, A CORPORATION OF DELAWARE

METHOD OF MEASURING PROTEOLYTIC ACTIVITY

Application filed June 19, 1929. Serial No. 372,016.

This invention relates to an improved method of measuring proteolytic activity, and, more particularly, to a polariscopic method for determining the proteolytic activity of enzyme-containing solutions by means of their action on a gelatin solution.

A general object of the invention is to provide a method for rapidly and accurately determining the proteolytic power of liquids containing proteolytic enzymes.

Other objects of the invention will in part be obvious and will in part appear hereinafter.

The invention accordingly comprises the several steps and the relation and order of one or more of such steps with respect to each of the others thereof which will be exemplified in the method hereinafter disclosed, and the scope of the application of which will be indicated in the claims.

For a fuller understanding of the nature and objects of the invention reference should be had to the following detailed description taken in connection with the accompanying drawing, in which there is shown a curve typical of the operation in accordance with the principles of the present invention.

When a gelatin solution is cooled, its polarization remains practically constant until the temperature reaches about 35° C., and as it is cooled further its laevorotation rapidly increases. It is believed that this characteristic action is caused by mutarotation which is inactive at temperatures of 35° C. or higher.

We have found that the mutarotation of gelatin is decreased by proteolytic enzymes, such as papain, pepsin, pancreatin and the proteolytic enzyme of malt owing to the digestion of the gelatin thereby. By correlating this activity of the enzymes with the change in mutarotation of a gelatin solution as it is cooled from 35° C. downward, a rapid and accurate method of determining proteolytic activity may be achieved. In general, this method includes the treatment of a gelatin solution with carying amounts of the enzyme-containing liquid to be tested, noting the change in mutarotation, and applying a formula to obtain the proteolytic power of the liquid.

Although any suitable temperature range for taking the polariscopic readings of the gelatin solution may be used from 35° C. downward, it is preferred that these readings shall be taken at 35° C. and at 20° C. Furthermore, in measuring the activity of proteolytic enzymes, such as papain, which have their maximum activity in slightly acid solution, it is preferred that a gelatin made from acid-conditioned stock be used, since solutions of such gelatines do not become turbid in slightly acid solution. In measuring the activity of proteolytic enzymes, such as pancreatin, which have their maximum activity in neutral or very slightly acid solution, it is preferred that a gelatin made from lime conditioned stock be used since solutions of such gelatines do not become turbid in neutral or vary slightly acid solution.

Since the proteolytic power of a liquid varies in accordance with the kind and amount of the proteolytic enzyme present, the proportions to be used of liquid to gelatin solution will vary. It is therefore difficult to set any definite limit to the relative amounts, although the general rule is that sufficient gelatin and sufficient enzyme-containing liquid shall be used to give definitely spaced polariscopic readings at the temperature ranges used, and that the proportions of the one to the other shall be varied sufficiently to give a plurality of points within the range of zero to 40% destruction of the mutarotation.

The following description and data indicate the nature and technique of the method and also serve as the basis for the derivation of the formula hereinafter used.

A gelatin solution was made containing two grams of air-dry gelatin per 100 cc., the acidity was adjusted to about 4.7 pH. A papain solution was made containing one gram per liter. In each of a number of flasks was placed an aliquot of the gelatin solution consisting of 50 cc., and to each was added 10 cc. of Walpole's acetate buffer solution of 4.8 pH (8 cc. of N/1 acetic acid and 12 cc. of N/1 sodium acetate, diluted to 100 cc.). A second series of flasks was next prepared containing varying amounts of the prepared papain solution, together with sufficient water to bring the volume of each to 40 cc. Both sets of flasks were then brought to about 45° C. in a thermostat, which latter temperature is that at which certain proteolytic enzymes, particularly papain, approach their maximum activity. The gelatin solutions were then poured one by one into the papain-containing solutions, notation being made of the time of mixing each, and each flask was then stoppered and the mixture heated at 45° C. for one hour. The flasks were then cooled sharply in ice water and refrigerated over night or from 12 to 14 hours at 5° C.

The next morning they were warmed to 20° C., in a constant temperature bath and allowed to stand at this temperature for about one hour, whereupon they were polarized at 20° C., and subsequently each tube was polarized at 35° C. in a jacketed tube of two decimeters in length. A portion of the control solution containing no papain was placed in a two-decimeter tube as soon as cooled after removal from the 45° C. thermostat, and was refrigerated and subsequently polarized as were the others.

The polarizations at 20° C. and 35° C. after correction for the polarization of the enzyme-containing solution are shown in the following table:

| Papain Mgr. per 100 cc. | Gelatin g. per 100 cc. | Polarizations 2 d. tube | | Mutarotation ° V. |
|---|---|---|---|---|
| | | 20° C. ° V. | 35° C. ° V. | |
| 0 | 1 | −13.4 | −7.3 | 6.1 |
| 2 | 1 | −12.85 | 7.3 | 5.55 |
| 4 | 1 | −12.3 | 7.3 | 5.0 |
| 6 | 1 | −11.8 | 7.25 | 4.55 |
| 8 | 1 | −11.25 | 7.15 | 4.10 |
| 10 | 1 | −10.75 | 7.15 | 3.60 |
| 15 | 1 | −9.7 | 6.95 | 2.85 |
| 20 | 1 | −9.0 | 6.95 | 2.05 |
| 25 | 1 | −8.4 | 6.90 | 1.5 |
| 30 | 1 | −7.95 | 6.85 | 1.1 |
| 35 | 1 | −7.75 | 6.80 | .95 |

By plotting the mutarotation, i. e., the difference between the polarizations of 20° and 35° C. against the amount of papain solution used, as shown in the drawing, it will be noted that the points up to about 40% of the complete destruction of the mutarotation lie practically in a straight line. Thus, regular declines of the rotations of gelatin at 20° and 35° C. may reasonably be regarded as measures of the digestive action of the proteolytic enzyme.

When the proteolytic activity of an unknown is to be determined, it is unnecessary to establish all of the intermediate points as are shown in the above table; a single point within the range of 40% digestion of the gelatin is sufficient. The percentage of gelatin digested can be readily calculated, and if it is over 40% the determination should be repeated, using less of the unknown. The proteolytic activity of the unknown may be computed by the application of the following formula:

$$P = \frac{W}{w.t}$$

Where P is the proteolytic power
W is the weight, in grams of air dry gelatin digested.
w is the weight of papain and
t is the time in hours.

Thus it will be seen that by the principles of the present invention there has been provided a convenient and accurate method of determining the proteolytic activity of liquids containing proteolytic enzymes, and since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which as a matter of language might be said to fall therebetween.

Having described our invention, what we claim as new and desire to secure by Letters Patent is:

1. A method of determining proteolytic activity of a liquid, which includes mixing different amounts of said liquid with a gelatin solution, incubating the mixture, taking polariscopic readings of each mixture at 35° C. and below 35° C., and calculating the amount of gelatin converted in the mixtures.

2. A method of determining proteolytic activity of a liquid, which includes mixing different amounts of said liquid with a gelatin solution, incubating the mixture, taking polariscopic readings of each mixture at 35° C. and 20° C., and calculating the difference in amount of gelatin converted in the mixtures.

3. A method of determining the proteolytic power of a liquid, which comprises preparing a standard gelatin solution, taking polariscopic readings of said solution at 35° C. and 20° C., adding to aliquots of said solution different amounts of the liquid; the largest of said amounts being not greater than that necessary to digest 40% of the gelatin solution under the conditions of the test; incubating said mixtures at 45° C., cooling to below 20° C. for about one hour, thereafter taking polariscopic readings of each of said mixtures at 35° C. and 20° C., and applying the formula $$P = \frac{W}{w.t}$$

Where P is the proteolytic power

W is the weight, in grams of air dry gelatin digested.
w is the weight of papain and
t is the time in hours.

4. A method of determining the proteolytic power of a liquid, which comprises preparing a standard gelatin solution, taking polariscopic readings of said solution at 35° C. and 20° C., adding to aliquots of said solution an amount of Walpole's acetate buffer solution and different amounts of the proteolytic liquid, the largest of said amounts being not greater than that necessary to digest 40% of the gelatin solution under the conditions of the test; incubating said mixtures at 45° C., cooling to below 20° C. for about one hour, thereafter taking polariscopic reading of each of said mixtures at 35° C. and 20° C., and applying the formula, $$P = \frac{W}{w.t}$$

Where P is the proteolytic power
W is the weight, in grams of air dry gelatin digested.
w is the weight of papain and
t is the time in hours.

5. A method of determining the proteolytic power of a liquid, which comprises preparing a standard gelatin solution, taking polariscopic readings of said solution at 35° C. and 20° C., adding to aliquots of said solution different amounts of the liquid; the largest of said amounts being not greater than that necessary to digest 40% of the gelatin solution under the conditions of the test; incubating said mixtures at 45° C., cooling to below 20° C. for about one hour, thereafter taking polariscopic readings of each of said mixtures at 35° C. and 20° C., determining the amount of gelatin digested, and applying the formula $$P = \frac{W}{w.t}$$

Where P is the proteolytic power
W is the weight, in grams of air dry gelatin digested.
w is the weight of papain and
t is the time in hours.

6. A method of determining the proteolytic power of a liquid, which comprises preparing a standard gelatin solution, taking polariscopic readings of said solution at 35° C. 20° C., adding to aliquots of said solution an amount of Walpole's acetate buffer solution and different amounts of the proteolytic liquid, the largest of said amounts being not greater than that necessary to digest 40% of the gelatin solution under the conditions of the test; incubating said mixtures at 45° C., cooling to below 20° C. for about one hour, thereafter taking polariscopic readings of each of said mixtures at 35° C. and 20° C., correcting the results for polarizing effect of the proteolytic liquid, and applying the formula, $$P = \frac{W}{w.t}$$

Where P is the proteolytic power
W is the weight, in grams of air dry gelatin digested.
w is the weight of papain and
t is the time in hours.

In testimony whereof we affix our signatures.

HERBERT C. GORE.
CHARLES N. FREY.